United States Patent [19]
Schulthess

[11] 3,753,147
[45] Aug. 14, 1973

[54] LASER OSCILLATOR-AMPLIFIER SYSTEM

[76] Inventor: Carl William Schulthess, Pomona, Calif.

[75] Inventor: Carl William Schulthess, Pomona, Calif.

[73] Assignee: Union Carbide Corporation, New York, N.Y.

[22] Filed: June 23, 1972

[21] Appl. No.: 265,665

[52] U.S. Cl. .............................................. 331/94.5
[51] Int. Cl. .............................................. H01s 3/02
[58] Field of Search ...................... 331/94.5; 330/4.3

[56] References Cited
UNITED STATES PATENTS
3,404,349 10/1968 Rigrod .............................. 331/94.5

*Primary Examiner*—William L. Sikes
*Attorney*—Pastoriza & Kelly

[57] ABSTRACT

An aperture plate having a central aperture and a 100 percent reflecting surface surrounding the central aperture is placed in the optical cavity of a laser rod to thereby confine generation of a laser beam to only a first portion of the rod that is in optical alignment with the central aperture. Laser light is directed through a second portion of the rod spaced from and parallel to the first portion so that it misses the central aperture and is intercepted and reflected by the 100% reflecting surface of the aperture plate, the laser light being amplified in the second portion so that a method and means are provided for both generation and amplification of laser light in a single laser rod.

8 Claims, 2 Drawing Figures

LASER OSCILLATOR-AMPLIFIER SYSTEM

This invention relates generally to laser systems and more particularly to a method and means for providing both generation and amplification of laser light in a single laser rod.

BACKGROUND OF THE INVENTION

It is known that laser rods in the form of synthetic host crystals doped with lasering ions can be used both for generation of a laser beam; that is, as an oscillator, and for amplification of laser light; that is, as a simple light amplifier. Many laser systems utilize an oscillator rod to provide for the generation of a laser beam in combination with a further rod utilized as a light amplifier for the generated radiation.

In some laser systems, an aperture plate has been utilized in the optical cavity to enable selection of a desired mode of laser light oscillation generated in the laser rod. Such an aperture plate might take the form of a flat plate structure disposed at an angle and having a central aperture surrounded by a 100 percent reflecting surface. By aligning the central aperture with the optical axis of the laser rod, the selected mode of oscillation will pass through the aperture. However, there is thus utilized only a portion of the rod in alignment with the aperture for the generation of the laser radiation and the remaining portions of the rod are wasted.

In U.S. Pat. No. 3,663,890 issued May 16, 1972 in which I am a co-inventor and which has been assigned to the same assignee as the present application, there is disclosed a two cavity laser system utilizing an aperture plate as described above but wherein an additional optical cavity is defined for a generated laser beam in a portion of the laser rod out of alignment with the central aperture of the plate. In this arrangement, this generated beam is reflected by the 100 percent reflecting surface of the aperture plate to another end mirror so that an L shaped second cavity is provided and a different mode of radiation can be provided simultaneously with the particular mode passing through the central aperture of the plate. The provision of the two generated beams for a single laser rod is very useful in holographic work.

BRIEF DESCRIPTION OF THE PRESENT INVENTION

The present invention contemplates a system utilizing one or more aperture plates with a laser rod in a novel and unique manner to enable a single laser rod to be used for both generation and amplification of laser light.

More particularly, the invention contemplates positioning an aperture plate having a central aperture and a 100 percent reflecting surface surrounding the central aperture in the optical cavity of a laser rod to thereby confine generation of a laser beam to only a first portion of the rod that is in optical alignment with the central aperture. Laser light is directed through a second portion of the rod spaced from and parallel to the first portion so that it misses the central aperture and is intercepted and reflected by said 100 percent reflecting surface of the aperture plate, the laser light being amplified in this second portion.

In a first embodiment of the invention the laser light directed through the second portion is provided by the generated laser beam in the first portion so that the single laser rod serves to generate and amplify its own light.

In a second embodiment of the invention, an additional laser rod and additional aperture plate cooperate to provide an additional laser beam. The additional beam constitutes the laser light directed through the second portion of the first mentioned laser rod for amplification therein and the first mentioned generated beam in turn is directed through a portion of the additional laser rod out of alignment with the central aperture of the additional aperture plate to be intercepted and reflected by the 100 percent reflecting surface of the additional aperture plate. The arrangement is such that the generated laser beam in one rod is amplified in the other at the same time that the generated beam in the other is amplified in the one. The two amplified laser lights are of the same frequency and may be combined in a suitable beam combiner to provide an output.

In both of the foregoing embodiments, maximum use is made of the material of the rod or rods as the case may be.

BRIEF DESCRIPTION OF THE DRAWINGS

A better understanding of the invention will be had by referring to the accompanying drawings in which.

DETAILED DESCRIPTION OF THE INVENTION

Figure 1:
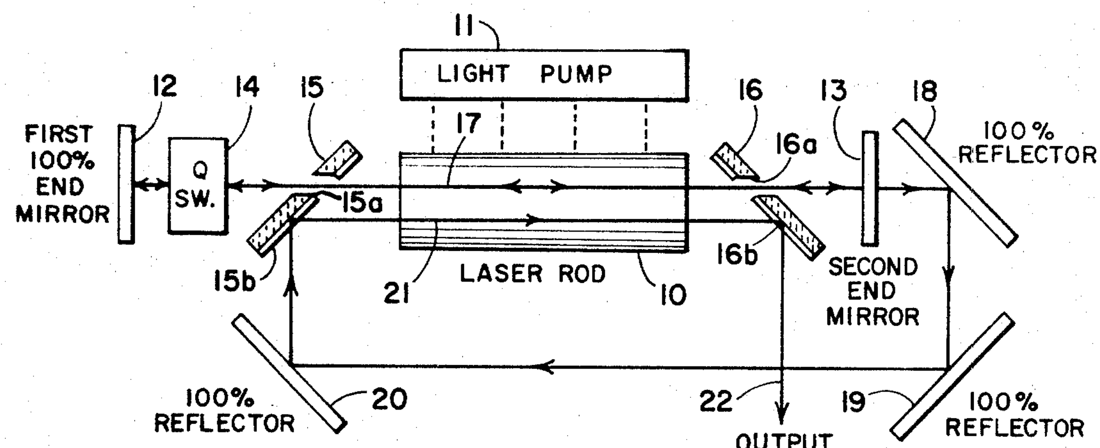
FIG. 1 illustrates a first embodiment of the invention wherein a single laser rod serves to both generate and amplify its own generated laser beam; and, FIG. 2 illustrates a second embodiment utilizing an additional laser rod each serving to amplify the generated radiation of the other.

Referring first to FIG. 1 there is shown a laser rod 10 which might, for example, constitute ruby. A light pump 11 is optically coupled to the laser rod 10 in the usual manner. A first end mirror 12 which is 100 percent reflecting cooperates with a second end mirror 13 which is partially reflecting and partially transmitting to define an optical cavity for the rod 10. A Q switch 14 may be incorporated in the optical cavity to provide for pulsed radiation which is coupled out of the optical cavity through the partially transmitting second end mirror 13.

In accord with the embodiment illustrated in FIG. 1, there is disposed in the optical cavity an aperture plate 15 having a central aperture 15a surrounded by a 100 percent reflecting surface **15*b*. An additional aperture plate 16 is also disposed in the optical cavity on the opposite side of the laser rod 10 from the aperture plate 15. Aperture plate 16 includes a central aperture 16*a* surrounded by a 100 percent reflecting surface 16*b*. The apertures for the aperture plates 15 and 16 are in optical alignment with a first portion of the laser rod so that regeneration can take place through the apertures between the end mirrors 12 and 13 to provide a generated laser beam indicated at 17.**

In addition to the foregoing components, there is provided a means for directing laser light through a second portion of the rod spaced from and parallel to the first portion so that it misses the central aperture and is intercepted and reflected by the 100 percent reflecting surface of the aperture plates. In the embodiment of FIG. 1 this directing means includes 100 percent reflecting mirrors 18, 19 and 20 disposed outside the optical cavity to route the generated laser beam partially transmitted through the second mirror 13 to the 100 percent reflecting surface 15b of the aperture plate 15 from whence the beam travels through a second portion of the laser rod 10 to constitute laser light 21 which is amplified in this second portion. The amplified light 21 in turn is reflected from the 100 percent reflecting surface of the additional aperture plate 16 to provide an amplified output at 22.

Figure 2:
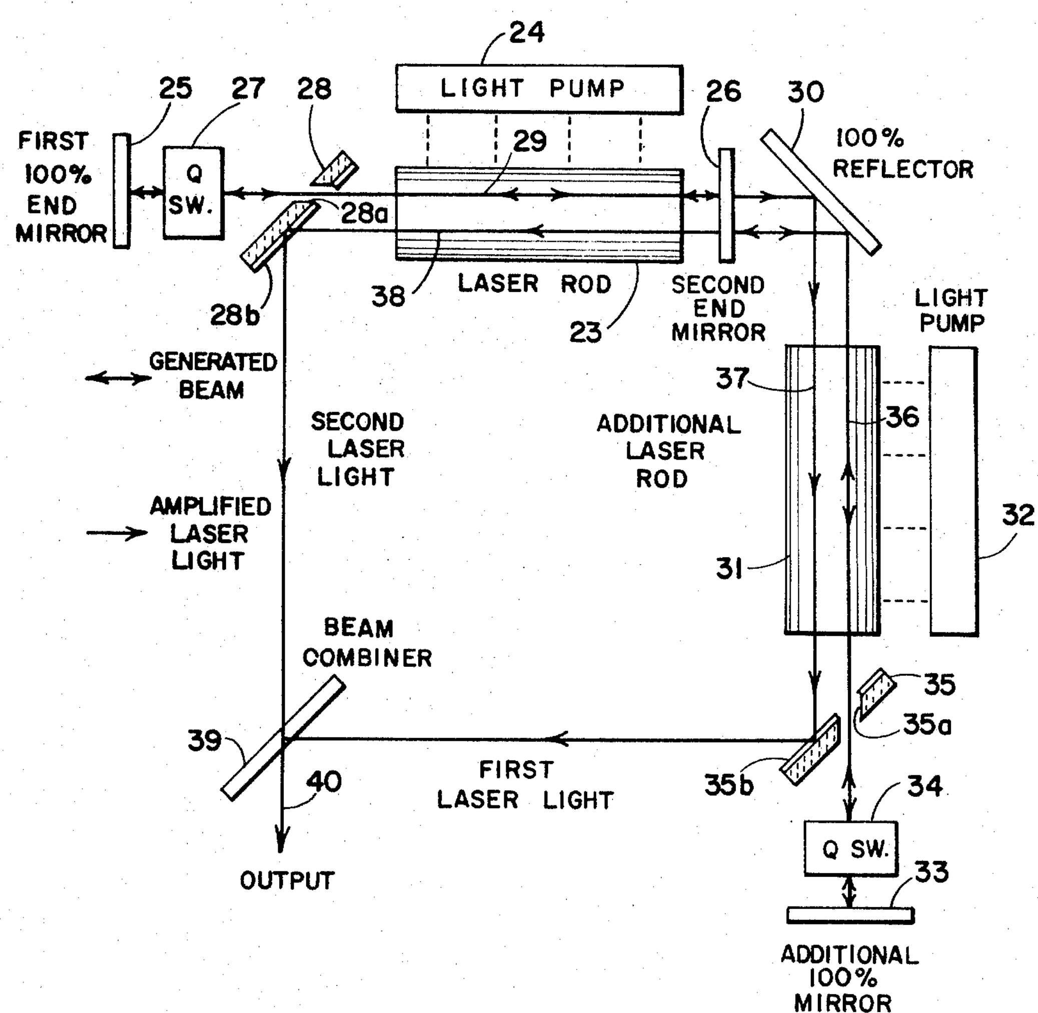

Referring now to FIG. 2 there is shown a second embodiment of the invention wherein the amplified laser light in the laser rod is provided from an additional laser rod. Thus, there is shown a laser rod 23 with an optically coupled light pump 24 cooperating with suitable first and second end mirrors 25 and 26 defining an optical cavity for the rod similar to the arrangement described in FIG. 1. A Q switch 27 may be included in the optical cavity as shown to provide for pulsed radiation.

As in the embodiment for FIG. 1, there is also disposed in the optical cavity an aperture plate 28 having a central aperture 28*a* and a 100 percent reflecting surface 28*b* surrounding the central aperture. The central aperture 28*a* is in optical alignment with a first portion of the laser rod 23 to confine the generation of a laser beam to this first portion. This generated laser beam is indicated at 29 and is coupled out of the cavity by the partially transmitting second end mirror 26 to a 100 percent reflector 30.

An additional laser rod 31 with an optically coupled additional light pump 32 is positioned in optical alignment with laser light reflected by the 100 percent reflector 30. An additional 100 percent reflecting end mirror 33 on the other side of the additional laser rod 31 defines with the second partially transmitting end mirror 26 an optical cavity for the rod 31, this cavity being L shaped as a consequence of the 45° orientation of the 100 percent reflector 30. A Q switch 34 may be disposed in this L shaped optical cavity as shown.

An additional aperture plate 35 is also disposed in the optical cavity having a central aperture 35*a* and a 100 percent reflecting surface 35*b* surrounding the central aperture. The central aperture 35*a* is in optical alignment with a first portion of the additional laser rod 31 and cooperates with the L shaped cavity and end mirrors 33 and 26 to generate an additional laser beam 36.

The positioning of the various components is such, as shown, that the first mentioned generated laser beam 29 after being coupled out of the second end mirror 26 and reflected by the reflector 30 passes through a second portion of the additional laser rod 31 parallel to and spaced from the first portion utilized for the generation of the additional laser beam 36. This laser light passing through the second portion is indicated at 37 and is out of alignment with the central aperture 35*a* of the aperture plate 35 so that it is reflected by the 100 percent reflecting surface 35*b* to constitute a first laser light output.

The additional generated laser beam 36, in turn, is coupled out of the second end mirror 26 after reflection from the reflector 30 to pass through a second portion of the first mentioned laser rod 23 spaced from and parallel to the first portion of the laser rod utilized for generation of the beam 29. This light in the second portion is indicated at 38 and is amplified by the first mentioned laser rod 23. Since it is out of alignment with the aperture 28*a* of the aperture plate 28, it is intercepted by the 100 percent reflecting surface 28*b* and directed out of the system to constitute a second laser light output.

A beam combiner 39 operating similar to a beam splitter recombines the first and second laser lights to provide an output 40.

In the embodiment of FIG. 2, it will thus be seen that the generated laser beam of one laser rod is amplified in the other rod and the generated beam in the other rod is amplified in the one rod.

OPERATION

The operation of both embodiments will be evident from the foregoing description.

In the embodiment of FIG. 1, the generated laser beam 17 is confined, as stated, to a first portion of the rod by the apertures 15*a* and 16*a* in the aperture plates 15 and 16. The output of this generated beam coupled from the second end mirror 13 is then directed to be intercepted by the 100 percent reflecting surface of the aperture plate 15 to pass through a second portion of the rod 10 as indicated at 21 wherein this laser light is amplified. The 100 percent reflecting surface surrounding the aperture in the aperture plate 16 in turn intercepts the amplified light and directs it out of the optical cavity. Thus, the single laser rod 10 serves to both generate and amplify its own light.

In the FIG. 2 embodiment the provision of the additional laser rod and the use of a single second end mirror 26 for both optical cavities for the rod provides a system wherein one laser rod amplifies the generated beam by the other laser rod and the other laser rod simultaneously amplifies the beam from the one laser rod. The first and second output beams are then combined in the beam combiner 39 as described.

It will thus be evident from the foregoing description that the present invention has provided a unique method and means for making maximum use of the material making up a laser rod wherein both generation and amplification can be effected in a single rod.

What is claimed is:

1. A method of providing for both generation and amplification of laser light in a single laser rod comprising the steps of:

a. positioning an aperture plate having a central aperture and a 100 percent reflecting surface surrounding said central aperture in the optical cavity of the rod to thereby confine generation of a laser beam to only a first portion of the rod that is in optical alignment with said central aperture; and b. directing laser light through a second portion of the rod spaced from and parallel to said first portion so that it misses the central aperture and is intercepted and reflected by said 100 percent reflecting surface of said aperture plate, the laser light being amplified in said second portion.

2. The method of claim 1, in which the laser light directed through said second portion is provided by said generated laser beam in said first portion so that the single laser rod serves to generate and amplify its own light.

3. The method of claim 1, including the steps of providing an additional laser rod and additional aperture plate cooperating to provide an additional generated laser beam, said additional beam constituting said laser light directed through said second portion of said first mentioned laser rod for amplification therein, said first mentioned generated beam being directed through a portion of said additional laser rod out of alignment with the central aperture of the additional aperture plate to be intercepted and reflected by the 100 percent reflecting surface of the additional aperture plate so that the generated laser beam in one rod is amplified in the other at the same time that the generated beam in the other is amplified in the one.

4. A laser oscillator-amplifier system comprising in combination:

a. a laser rod;

b. a light pump optically coupled to said laser rod;

c. a first end mirror and a second end mirror defining an optical cavity for said laser rod, said first end mirror being 100 percent reflecting and said second end mirror being partially reflecting and partially transmitting to couple out the laser light;

d. an aperture plate positioned in said optical cavity, said aperture plate having a central aperture and a 100 percent relfecting surface surrounding said central aperture so that a generated laser beam is established in a first portion of said rod in optical alignment with said central aperture; and, e. means for directing laser light through a second portion of said rod spaced from and parallel to said first portion so that it misses the central aperture and is intercepted and reflected by said 100 percent reflecting surface of said aperture plate, the laser light being amplified in said second portion, whereby a single laser rod in combination with said aperture plate can be used both for generation and amplification of laser light.

5. A laser oscillator-amplifier system according to claim 4, in which said means for directing laser light through a second portion of said rod includes an additional aperture plate having a central aperture surrounded by a 100 percent reflecting surface disposed in said optical cavity in a position on the other side of said laser rod from said first mentioned aperture plate with its central aperture in optical alignment with said generated laser beam; and means disposed outside said optical cavity in positions to intercept the output laser light from the partially transmitting second end mirror and direct it back to said 100 percent reflecting surface of said first mentioned aperture plate from whence it passes through said second portion of said laser rod and constitutes said laser light amplified therein, the amplified laser light then being intercepted by the 100 percent reflecting surface of said additional aperture plate to reflect it out of the laser system in the form of an outout laser light beam, said laser rod thus serving to amplify the same laser light it generates.

6. A laser oscillator-amplifier system according to claim 4, in which said means for directing laser light through a second portion of said rod includes an additional laser rod; an additional light pump optically coupled to said additional laser rod; a 100 percent reflecting additional end mirror defining with said second end mirror an additional optical cavity for said additional laser rod, the light generated by said additional laser rod constituting an additional generated laser beam which is coupled out of said additional optical cavity by said second end mirror to pass through said second portion of said first mentioned laser rod and constitutes said laser light amplified thereby; an additional aperture plate having a central aperture surrounded by a 100 percent reflecting surface disposed in said additional optical cavity between said additional laser rod and said additional end mirror, said central aperture being in optical alignment with said additional generated laser beam so that said additional generated laser beam is generated in a portion only of said additional laser rod, said first mentioned generated laser beam coupled out of said second end mirror passing through another portion of said additional laser rod wherein it is amplified and intercepted by said 100 percent reflecting surface of said additional aperture plate and thereby reflected out of said laser system to constitute first amplified laser light, said additional generated laser beam amplified in said first mentioned laser rod being intercepted by the 100 percent reflecting surface of said first mentioned aperture plate and thereby reflected out of said laser system to constitute second amplified laser light; and a beam combiner positioned to combine said first amplified laser light and said second amplified laser light into a single overall output beam, the frequency of said first mentioned generated laser beam being the same as said additional generated beam so that said second end mirror functions as an optical cavity end mirror for both laser rods, the generated laser beam in one rod being amplified in the other at the same time the generated beam in the other is amplified in the one.

7. A laser oscillator-amplifier system according to claim 5, including a Q switch in said optical cavity to provide a pulsed output beam.

8. A laser oscillator-amplifier system according to claim 6, including a Q switch in said first mentioned optical cavity and a Q switch in said additional optical cavity so that the first and second amplified laser lights are in the form of pulses.

* * * * *